(12) United States Patent
Yun et al.

(10) Patent No.: US 6,188,587 B1
(45) Date of Patent: Feb. 13, 2001

(54) SWITCHING MODE POWER SUPPLY HAVING REDUCED SWITCHING LOSSES IN STANDBY MODE

(75) Inventors: Jeong-Yul Yun; Hyung-Mook Choi, both of Kyungki-do (KR)

(73) Assignee: Samsung Electronics Co., Ltd., Suwon-City (KR)

(*) Notice: Under 35 U.S.C. 154(b), the term of this patent shall be extended for 0 days.

(21) Appl. No.: 09/313,059

(22) Filed: May 17, 1999

(30) Foreign Application Priority Data

May 16, 1998 (KR) ................................................ 98-17735

(51) Int. Cl.[7] .................................................. H02M 3/335
(52) U.S. Cl. ................................................ 363/21; 363/49
(58) Field of Search ................................. 363/15, 16, 18, 363/19, 20, 21, 49, 97, 131

(56) References Cited

U.S. PATENT DOCUMENTS

| 4,937,728 | * | 6/1990 | Leonardi | ............................... 363/97 |
| 5,689,407 | * | 11/1997 | Marinus et al. | ...................... 363/21 |
| 5,812,383 | * | 9/1998 | Majid et al. | ............................ 363/21 |

* cited by examiner

Primary Examiner—Jessica Han
(74) Attorney, Agent, or Firm—Marger Johnson & McCollom, P.C.

(57) ABSTRACT

A switching mode power supply reduces switching losses during standby mode by alternately enabling and disabling the switching operation of a main switch during standby mode. When the main switch is enabled, it is forced to operate at a duty cycle which is greater than the minimum duty cycle. Therefore, the average switching frequency is reduced during standby mode, and switching losses are reduced accordingly. The switching mode power supply includes a current supply circuit which provides a first amount of current to a feedback capacitor when the main switch is operating, and a second, lower amount of current when the main switch is not operating. In standby mode, when the main switch is not operating, the reduced current from the current supply circuit causes the voltage across the feedback capacitor to be held at an artificially low level compared to normal mode, thereby causing the main switch to remain off even though the output voltage is below the setpoint level. When the output voltage finally falls low enough to cause the switch to turn on, the current from the current supply circuit returns to the normal level, and the power supply operates as if it was in normal mode. However, because the output voltage is well below the setpoint level, the switch operates at a high duty cycle, and since there is a light load in standby mode, only a few switching cycles are required to bring the output voltage back up to the setpoint level. Therefore, the average number of switching cycles in standby mode is reduced, and switching losses are reduced accordingly.

25 Claims, 8 Drawing Sheets

SWITCHING MODE POWER SUPPLY HAVING REDUCED SWITCHING LOSSES IN STANDBY MODE

This application claims priority from Korean patent application No. 98-17735 filed May 16, 1998 in the name of Samsung Electronics Co., Ltd., which is herein incorporated by reference for all purposes.

BACKGROUND OF THE INVENTION

1. Field of the Invention

The present invention relates generally to switching mode power supplies, and more particularly, to a method and apparatus for reducing switching losses during standby mode in a switching mode power supply.

2. Description of the Related Art

Conventional electronic devices such as televisions, computer monitors, VCRs, etc., operate in a normal mode in which considerable power is consumed, and in a standby mode in which little power is consumed while waiting for the normal mode to resume.

Although most electronic devices consume less power in standby mode than in normal mode, most electronic devices remain in standby mode much longer than normal mode. Consequently, most countries have recently started placing restrictions on the amount of power consumed by devices in standby mode.

Conventional electronic devices attempt to reduce power consumption in standby mode by utilizing auxiliary power supplies, reducing input power, etc. However, the implementation of these methods increases the manufacturing cost considerably.

When a switching mode power supply ("SMPS") operates in standby mode, most of the input power is consumed by the switching losses of a main switch, which is coupled to the primary winding of a transformer, and by an integrated circuit (IC) which controls the operation of the main switch. Therefore, to reduce power consumption in standby mode, it would be desirable to reduce switching losses from the main switch in standby mode.

SUMMARY OF THE INVENTION

It is therefore, an object of the present invention to reduce the power consumption of an SMPS in standby mode.

A further object of the present invention is to provide an inexpensive technique for reducing the power consumption of an SMPS in standby mode.

Another object of the present invention is to reduce the switching losses of an SMPS in standby mode.

To accomplish these and other objects, an SMPS in accordance with the present invention reduces switching losses during standby mode by alternately enabling and disabling the switching operation of a main switch during standby mode. When the main switch is enabled, it is forced to operate at a duty cycle which is greater than the minimum duty cycle. Therefore, only a few switching cycles are required to maintain the output voltage, so the average switching frequency is reduced during standby mode, and switching losses are reduced accordingly.

One aspect of the present invention is an SMPS which includes a current supply circuit that supplies a first amount of current when the main switch is enabled (i.e., is switching), and a second, lower amount of current when the main switch is disabled (i.e., has stopped switching). The current from the current supply circuit is used to charge a feedback capacitor, thereby generating a feedback voltage across the capacitor. A switch driver controls the operation of the main switch in response to the feedback voltage. A higher feedback voltage causes the switch to operate at a higher duty cycle. When the feedback voltage drops below a level that corresponds to the minimum duty cycle, the main switch stops switching.

Feedback control of the power supply output voltage is provided by a dependent current source which is coupled in parallel with the feedback capacitor so as to divert current from the current supply circuit away from the feedback capacitor. As the output voltage increases, the current flow through the dependent current source increases, and more current is diverted from the feedback capacitor. This causes the feedback voltage to decrease, and consequently, the duty cycle of the main switch decreases.

During normal mode, the power supply operates in a condition of equilibrium in which the current flowing through the dependent current source balances the first, higher amount of current from the current supply circuit, thereby maintaining the feedback voltage at a level required to maintain the output voltage at a predetermined level.

Standby mode begins when the load decreases rapidly. This causes the output voltage to momentarily rise higher than the predetermined output level because the main power section tends to provide constant power. As the output voltage rises, the current through the dependent current source increases rapidly, thereby diverting additional current from the feedback capacitor and causing the feedback voltage to fall below the level corresponding to the minimum duty cycle. This causes the main switch to stop switching, which in turn, causes the current supply circuit to begin supplying the second, lower amount of current, and also causes the output voltage to begin decreasing.

With the current supply circuit operating at the second, lower current level, the dependent current source diverts enough current from the feedback capacitor to maintain the feedback voltage below the level corresponding to the minimum duty cycle, even though the output voltage is below the predetermined level. Therefore, the main switch remains off.

As the output voltage continues to fall, the current through the dependent current source decreases until it falls below the second, lower current level from the current supply circuit, and the feedback capacitor then begins charging. This causes the feedback voltage to increase, and when it reaches the level corresponding to the minimum duty cycle, the main switch begins operating again. The switching operation of the main switch causes the current supply circuit to begin sourcing current at the first, higher level again, which consequently causes the feedback voltage across the feedback capacitor to rise rapidly, so the main switch operates at a duty cycle that is greater than the minimum duty cycle. The output voltage rises rapidly because there is only a small load on the power supply during standby mode even though the switch is operating at a relatively high duty cycle.

The increasing output voltage causes the current flowing through the dependent current source to increase, so more current from the current supply circuit is diverted from the charging capacitor. The feedback voltage is pulled below the level corresponding to the minimum duty cycle, so the main switch stops switching. The power supply continues to alternately start and stop the switching operation of a main switch as long as it remains in standby mode.

Another aspect of the present invention is a switching a switching mode power supply comprising: a main power section having a main switch for providing output power to a load in a normal mode and a standby mode; a switch driver coupled to the main switch for controlling the main switch responsive to a feedback signal, wherein the switch driver disables the main switch when the feedback signal reaches a level corresponding to a minimum duty cycle; a feedback circuit coupled to the switch driver for generating the feedback signal responsive to the output power; and a feedback manipulation circuit coupled to the feedback circuit for manipulating the feedback signal during standby mode to disable the main switch during a first period in standby mode and to force the main switch to operate at a duty cycle which is greater than the minimum duty cycle during a second period of standby mode.

BRIEF DESCRIPTION OF THE DRAWINGS

The accompanying drawings, which are incorporated in and constitute a part of the specification, illustrate preferred embodiments of the present invention, and, together with the description, serve to explain the principles of the invention.

DETAILED DESCRIPTION

Figure 1:
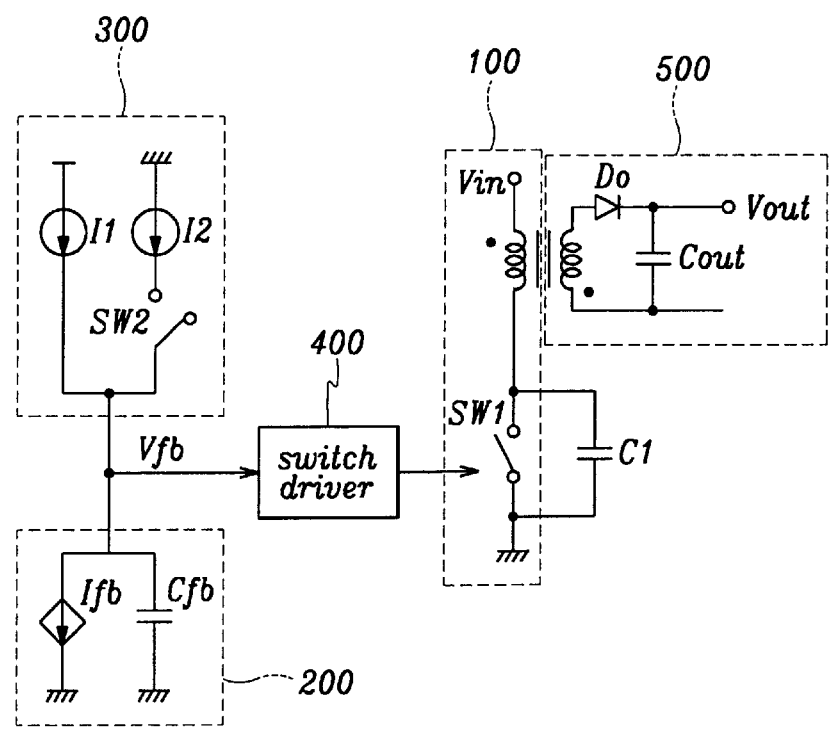
FIG. 1 is a conceptual circuit diagram of an embodiment of an SMPS in accordance with the present invention.

As shown in FIG. 1, an SMPS in accordance with the present invention comprises a main power section 100, a feedback circuit 200, a current supply circuit 300, and a switch driver 400.

The main power section 100 includes a primary winding coupled to an input supply voltage Vin, a capacitor C1 connected to the primary winding, and a main switch SW1 connected in parallel with capacitor C1. The main power section 100 receives the input voltage Vin and supplies the output voltage Vout to a load 500 through a transformer. The amount of output power is controlled by the duty cycle of the main switch SW1.

As with most SMPSs, the circuit of FIG. 1 feeds back the output voltage Vout, and utilize the feedback voltage to control the duty cycle of the main switch SW1 in the main power section 100, thereby providing an appropriate output voltage to the load 500.

The feedback circuit 200 includes a dependent current source Ifb and a capacitor Cfb. The current from the dependent current source Ifb varies in response to the output voltage Vout. The feedback circuit 200 detects the output voltage Vout and generates a feedback voltage Vfb which controls the switch driver 400. If the output voltage Vout increases, the current Ifb increases. Consequently, the feedback voltage Vfb, which appears across capacitor Cfb, decreases.

The current supply circuit 300 supplies current to capacitor Cfb and, as shown in FIG. 1, comprises two current sources I1 and I2, and a switch SW2. In a preferred embodiment of the present invention, the current from the current supply circuit 300 is always provided to capacitor Cfb from both either the current source I1 alone or from the current sources I1 and I2 simultaneously. In standby mode, the switch SW2 turns off when the main power section 100 stops operating (that is, when the main switch SW1 stops switching), and turns on while the main power section 100 starts operating. That is to say, current is provided to capacitor Cfb from both currents sources I1 and I2 simultaneously while the main power section 100 is operating, and from only the current source I1 when the main power section 100 stops operating. Therefore, in the standby mode, more current is provided to capacitor Cfb while the main switch SW1 executes switching operations than when it stops switching.

The switch driver 400 controls the main switch SW1 in response to the feedback voltage Vfb from the feedback circuit 200.

The operation of the SMPS of FIG. 1 will now be described.

In a conventional SMPS, a main switch operates at a fixed switching frequency corresponding to a minimum duty cycle in standby mode. However, occasionally, the switch must operate at a duty cycle that is lower than the minimum duty cycle to control the output voltage. In such a case, an intermittent switching pattern is adopted (i.e., one or two switching periods are skipped). However, this still results in high switching losses in standby mode.

To overcome this problem, an SMPS in accordance with the present invention as illustrated in FIG. 1 operates in standby mode by repeatedly alternating between operating at a duty cycle which is greater than the minimum duty cycle and operating with a duty cycle of zero. To accomplish this, the circuit of FIG. 1 varies the magnitude of the current from the current supply circuit 300 to the feedback circuit depending on whether the main switch SW1 is operating.

When the main switch SW1 stops operating, switch SW2 turns off and, consequently, only the current I1 is provided to capacitor Cfb. Since power is not provided to the load when switch SW1 stops operating, the output voltage Vout decreases continuously.

Therefore, the current Ifb decreases continuously. When Ifb decreases below the value of I1, capacitor Cfb charges, thereby increasing the feedback voltage Vfb.

When the feedback voltage Vfb exceeds a predetermined reference voltage corresponding to the minimum duty cycle, the switch driver 400 begins operating the main switch SW1. This in turn causes SW2 to turn on, thereby causing the current supply circuit 300 to provide both currents I1 and I2 to capacitor Cfb. The sudden increase in current to capacitor Cfb causes the voltage Vfb to increase, which in turn causes the power supply section 100 to operate with a duty cycle that is larger than the minimum duty cycle. This causes the output voltage Vout to increase, and the current Ifb increases accordingly. When current Ifb exceeds the sum of I1 and I2, capacitor Cfb begins discharging, and the feedback voltage Vfb decreases accordingly. When the feedback voltage decreases below the reference voltage corresponding to the minimum duty cycle, the switch driver 400 causes the main switch SW1 to stop switching. The above described steps are then repeated as long as the SMPS remains in standby mode.

Figure 2:
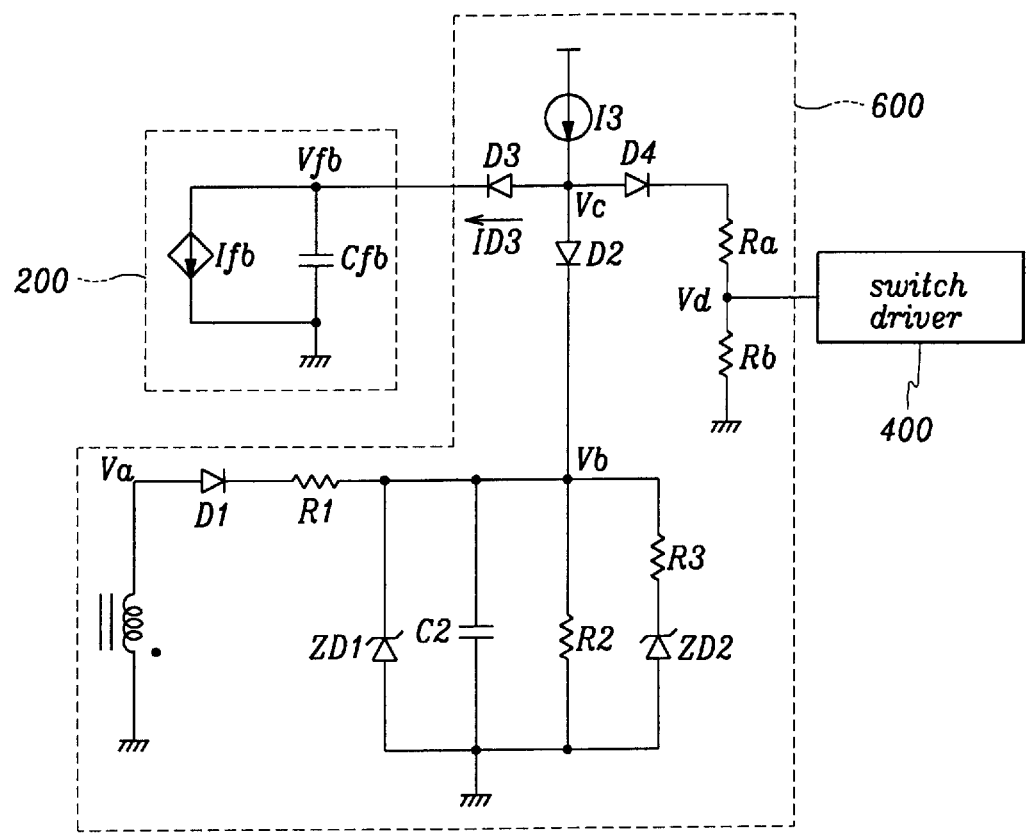
FIG. 2 shows a first preferred embodiment of the current supply circuit of FIG. 1.

FIG. 2 shows a first preferred embodiment of the current supply circuit in FIG. 1.

As shown in FIG. 2, a current supply circuit 600 comprises a current source I3, resistors Ra, Rb, R1, R2, R3, a capacitor C2, diodes D1, D2, D3, D4 and zener diodes ZD1, ZD2.

Diodes D2, D3, D4 all have anodes connected to the current source I3. The cathode of diode D3 is connected to one terminal of capacitor Cfb of the feedback circuit 200. Resistors Ra, Rb are connected in series between the cathode of diode D4 and a ground voltage. A node voltage Vd between resistor Ra and resistor Rb is input to the switch driver 400.

Diode D1 has its anode connected to a secondary winding which is coupled to a primary winding of the main power section 100, and its cathode is connected to one terminal of resistor R1. Resistor R1 has its other terminal connected to the cathode of the zener diode ZD1, and one terminal of each of capacitor C2 and resistors R2 and R3. The other terminal of resistor R3 is connected to the cathode of zener diode ZD2. The anodes of the zener diodes ZD1, ZD2, and the other terminals of capacitor C2 and resistor R2 are grounded.

The operation of the current supply circuit 600 in FIG. 2 in the normal operation mode will now be described.

In normal mode, a winding voltage Va, which is induced on the secondary winding by the primary winding during every switching cycle, charges capacitor C2 through diode D1 until the voltage across C2 reaches the breakdown voltage of zener diode ZD1. Capacitor C2 is charged to the breakdown voltage level in a period of time that is shorter than the switching cycle of the main power section 100. When the voltage Vb of capacitor C2 reaches the breakdown voltage, diode D2 is reverse biased. Thus, diode D2 is always off in normal mode. Consequently, the current from current source I3 flows through diodes D3 and D4. The current supplied to the feedback circuit 200 increases, which is analogous to the switch SW2 of FIG. 1 turning on.

When the output voltage Vout is slightly greater than the predetermined output voltage in normal mode due to a variation in the load, the current Ifb increases due to the increase in the output voltage Vout. As a result, the feedback voltage Vfb across capacitor Cfb decreases, and the voltage Vd, which is applied to the switch driver 400 decreases. This causes the switch driver 400 to reduce the duty cycle of the main power supply section 100, thereby reducing the output voltage Vout to the predetermined level.

If the output voltage falls below the predetermined level due to variations in the load, the current Ifb decreases, and capacitor Cfb is charged by current from current source I3 via diode D3. This causes the feedback voltage Vfb to increase, and the voltage Vd increases accordingly, thereby causing the switch driver 400 to increase the duty cycle of the main switch SW1 in power supply section 100. This causes the output voltage Vout to increase to the predetermined level.

The operation of the circuit of FIG. 2 in standby mode will now be described with referenced to FIG. 3. When the main power section 100 stops switching, the winding voltage Va induced on the secondary winding decreases to almost ground level causing diode D1 to turn off. Capacitor C2 discharges via resistor R2. When Vb decreases below the value of the feedback voltage Vfb, diode D2 turns on, and a portion of the current from current source I3 flows through D2 and R2. Therefore, the current supplied to the feedback circuit 200 is reduced by the amount of current flowing through D2. Since the main power section 100 has stopped operating, the output voltage Vout as shown in FIG. 3 decreases, thereby causing the current Ifb to decrease.

When the current Ifb decreases to a level that is less than the current flowing through D3, capacitor Cfb begins charging. When the feedback voltage Vfb reaches the reference voltage corresponding to the minimum duty cycle, the main switch SW1 begins switching again, and the winding voltage Va increases causing diode D1 to turn on. As capacitor C2 charges, voltage Vb increases until diode D2 turns off. Current ID3, which flows to the feedback circuit 200 via diode D3, then increases rapidly. The feedback voltage Vfb develops a ripple which is much larger than the reference voltage corresponding to the minimum duty cycle. Thus, the main switch SW1 switches at a duty cycle that is much larger than the minimum duty cycle, thereby causing the output voltage Vout to increase. When Vout reaches the predetermined output voltage, the main power section 100 stops operating, and the operations described above are repeated.

Figure 3:
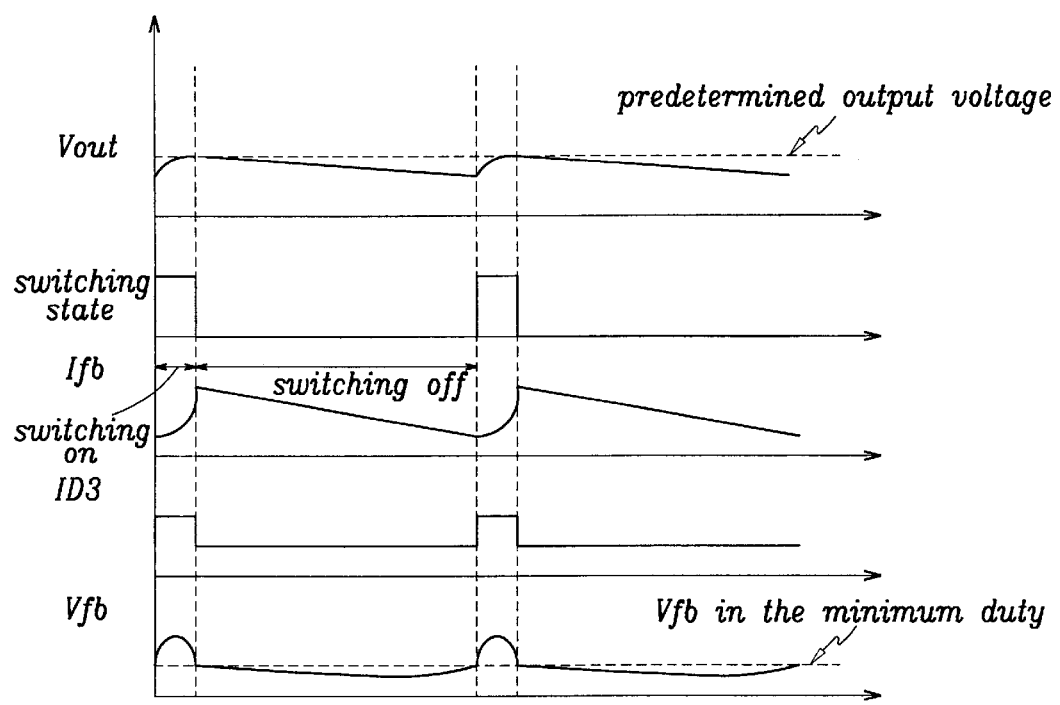
FIG. 3 shows waveforms of the main operation of each circuit described in FIG. 2 in the standby mode.

The transient periods when the main power section turns on and off are not shown in the waveforms of FIG. 3 because they are shorter than the switching cycle of the main switch SW1.

Because the current supplied to the feedback circuit while the main power section is on is smaller than the current supplied while the main power section is off, the off periods are longer than the on period. Thus, the switching frequency decreases, and switching losses are reduced.

A second preferred embodiment of a current supply circuit 700 according to the present invention will be described with reference to FIG. 4.

Figure 4:
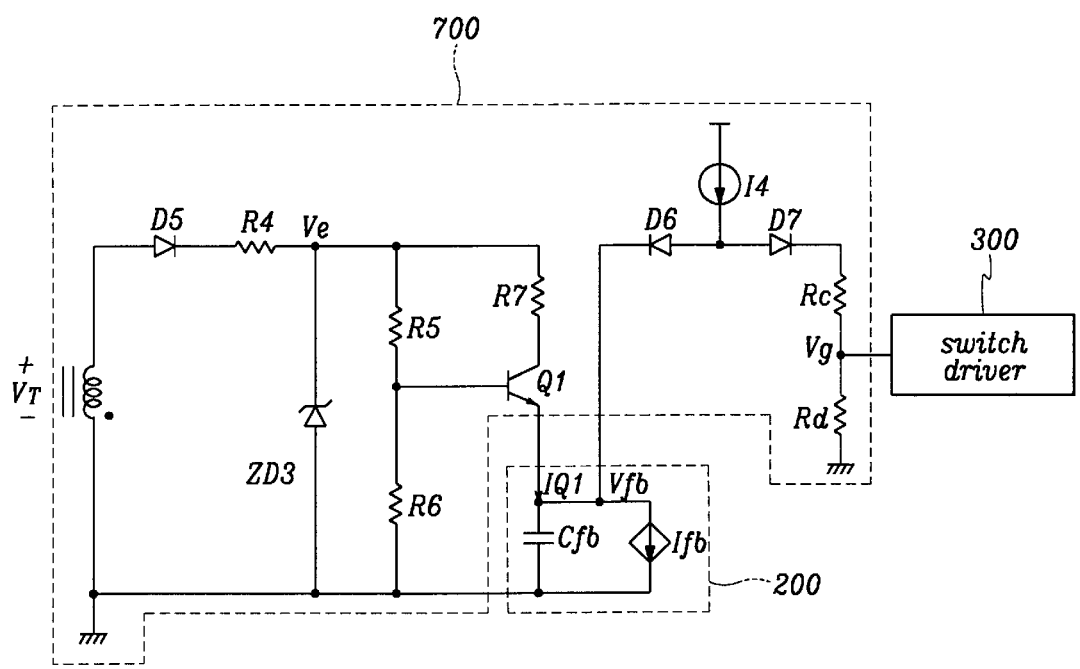
FIG. 4 shows a second preferred embodiment of the current supply circuit of FIG. 1.

As shown in FIG. 4, a current supply circuit 700 comprises a current source I4; diodes D5, D6, D7; resistors R4, R5, R6, R7, Rc, Rd; a zener diode ZD3; and a NPN bipolar transistor.

Diode D5 has its anode connected to the secondary winding, which is coupled to the primary winding of the main power section 100 in FIG. 1, and its cathode connected to one terminal of resistor R4. The other terminal of resistor R4 is connected to the cathode of the zener diode ZD3 and one terminal of each of resistors R5, R7. The other terminal of resistor R5 is connected to one terminal of resistor R6 and the base of the transistor Q1. Transistor Q1 has its collector connected to the other terminal of resistor R7 and its emitter coupled to one terminal of capacitor Cfb in the feedback circuit 200.

The anodes of diodes D6 and D7 are connected to the current source I4. The cathode of diode D6 is connected to one terminal of capacitor Cfb. Resistors Rc, Rd are connected in series between diode D7 and the around. The voltage at the node between resistor Rc and resistor Rd is input to the switch driver 300.

The operation of the main power section 700 shown in FIG. 4 will be described.

In normal mode, the main power section 100 operates at a high duty cycle to maintain the output voltage Vout to a normal load. Thus, the feedback voltage Vfb remains at a relatively high level. The voltage Vt induced on the secondary winding is rectified by D5 and flows through ZD3. The voltage Ve across zener diode ZD3 is divided by resistors R5 and R6 and applied to the base of transistor Q1. Since Vfb is relatively high during normal mode, the base-emitter junction of Q1 is reversed bias and Q1 turns off.

Figure 5:
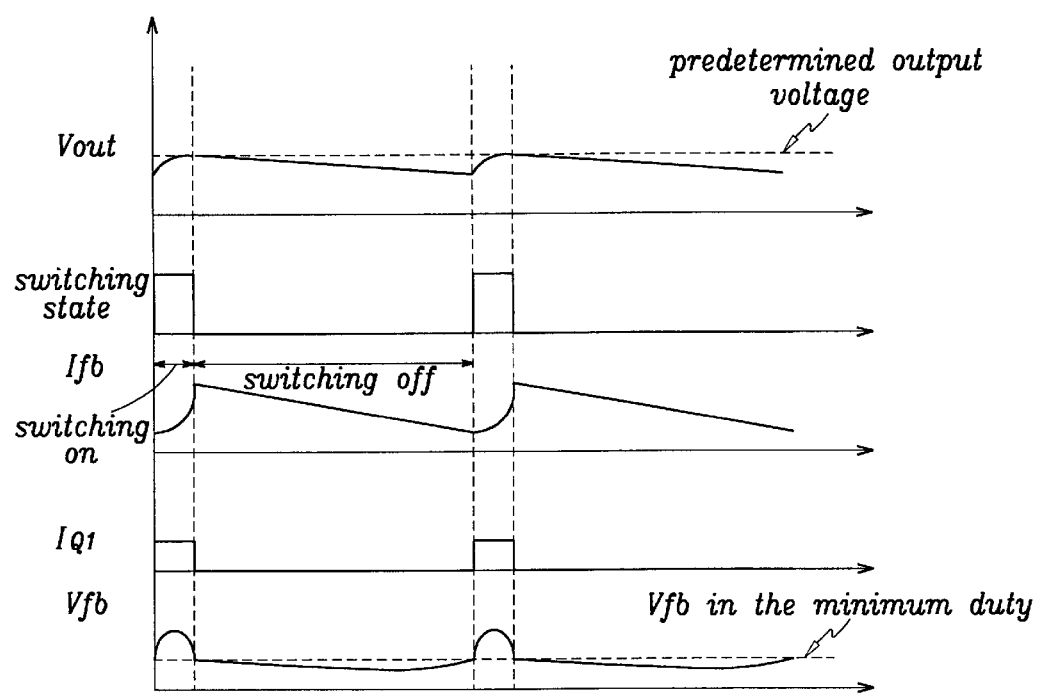
FIG. 5 shows waveforms of the main operation of each circuit described in FIG. 4 in the standby mode.

The operation of current supply circuit 700 in standby mode will now be described with reference to FIG. 5. When the main power section 100 stops operating, the voltage induced on the secondary winding decreases to almost ground level, thereby causing the voltage at the base of Q1 to decrease to almost ground level as well. Thus, transistor Q1 remains off. Since the main power supply section 100 is not operating, the output voltage Vout decreases continuously causing the dependent current Ifb to decrease. When the current Ifb decreases below the level of the current flowing through D6, capacitor Cfb begins charging. When the feedback voltage Vfb increases to the reference level corresponding to the minimum duty cycle, the main switch SW1 begins switching, thereby causing the winding voltage Vt to increase. This turns on transistor Q1 because the feedback voltage Vfb is near the reference voltage corresponding to the minimum duty cycle. When transistor Q1 turns on, the current supplied to the feedback circuit 200 increases rapidly causing a ripple in the feedback voltage Vfb which is higher than the reference voltage corresponding to the minimum duty cycle. This in turn causes the main power section 100 to operate at a duty cycle which is greater than the minimum duty cycle. This causes the output voltage Vout to increase until it reaches the predetermined output level at which point the main supply section 100 stops operating and the steps described above are repeated.

Figure 6:
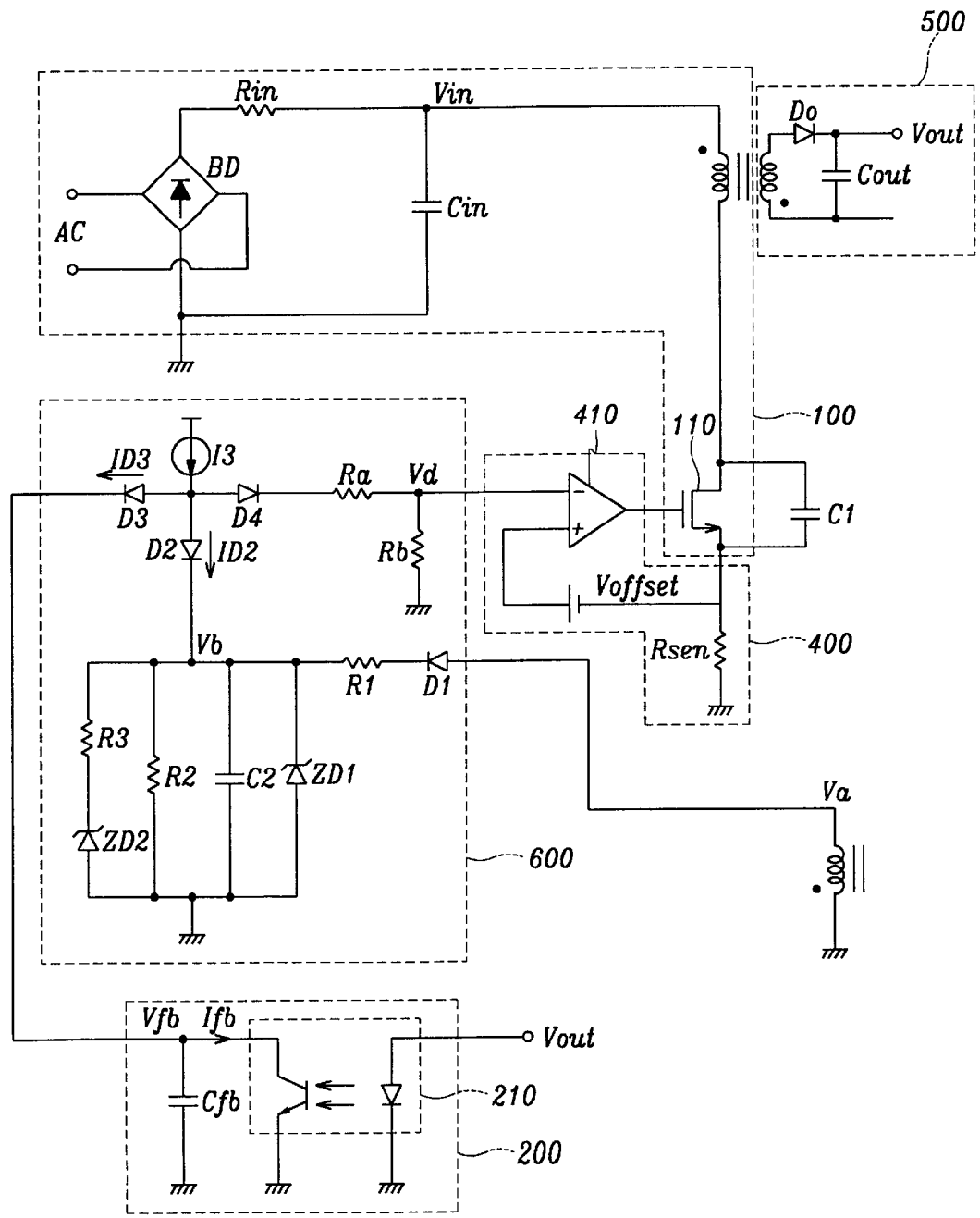
FIG. 6 shows a more detailed circuit diagram of an SMPS in accordance with the first preferred embodiment of the present invention.

FIG. 6 is a diagram showing more details of the first embodiment of the present invention. Elements in FIG. 6 which correspond to those of FIGS. 1 and 2 are described using the same reference numerals, and the description of their operation will not be repeated here.

FIG. 6 shows more details of an SMPS in accordance with the first embodiment of the present invention. Corresponding elements from FIG. 1 and FIG. 2 are described using the same reference numerals.

In FIG. 6, the main power section 100, which is described generally in FIG. 1, further includes a bridge diode BD for rectifying an AC input, and a capacitor Cin and resistor Rin for filtering the rectified voltage. The main power section 100 utilizes a MOS (metal oxide semiconductor) switching transistor 110 as the main switch.

The dependent current source Ifb of the feedback circuit 200 utilizes a photo-coupler 210.

The switch driver 400 has a sensing resistor Rsen connected between ground and the source of MOS transistor 110, an offset voltage source, and a comparator 410 for receiving the output voltage from current supply circuit 600 and the offset voltage Voffset at its inverted and non-inverted input terminals, respectively.

Hereinafter, the operation of the detailed circuit in FIG. 6 is described with reference to FIG. 7.

A high power level is supplied to the load in normal mode, so transistor 110 switches at a large duty cycle. The output voltage Vout is maintained at the predetermined voltage in normal mode and accordingly, the feedback voltage Vfb remains constant. A steady current flows from current source I3 through diode D3, but not through diode D2.

When the load decreases rapidly, the circuit of FIG. 6 changes from normal mode to standby mode. When the load decreases, the output voltage Vout instantaneously becomes higher than the predetermined voltage because the main power section 100 tries to provide constant output power. As the output voltage Vout increases, the current Ifb from the photocoupler 210 increases greatly, thereby discharging capacitor Cfb and causing the feedback voltage Vfb to decrease greatly compared to normal mode. The voltage Vd applied to comparator 410 becomes lower than the offset voltage Voffset, and therefore, switching transistor 110 stops switching, and the SMPS of FIG. 6 enters standby mode.

The operation in standby mode has been described above.

Figure 7:
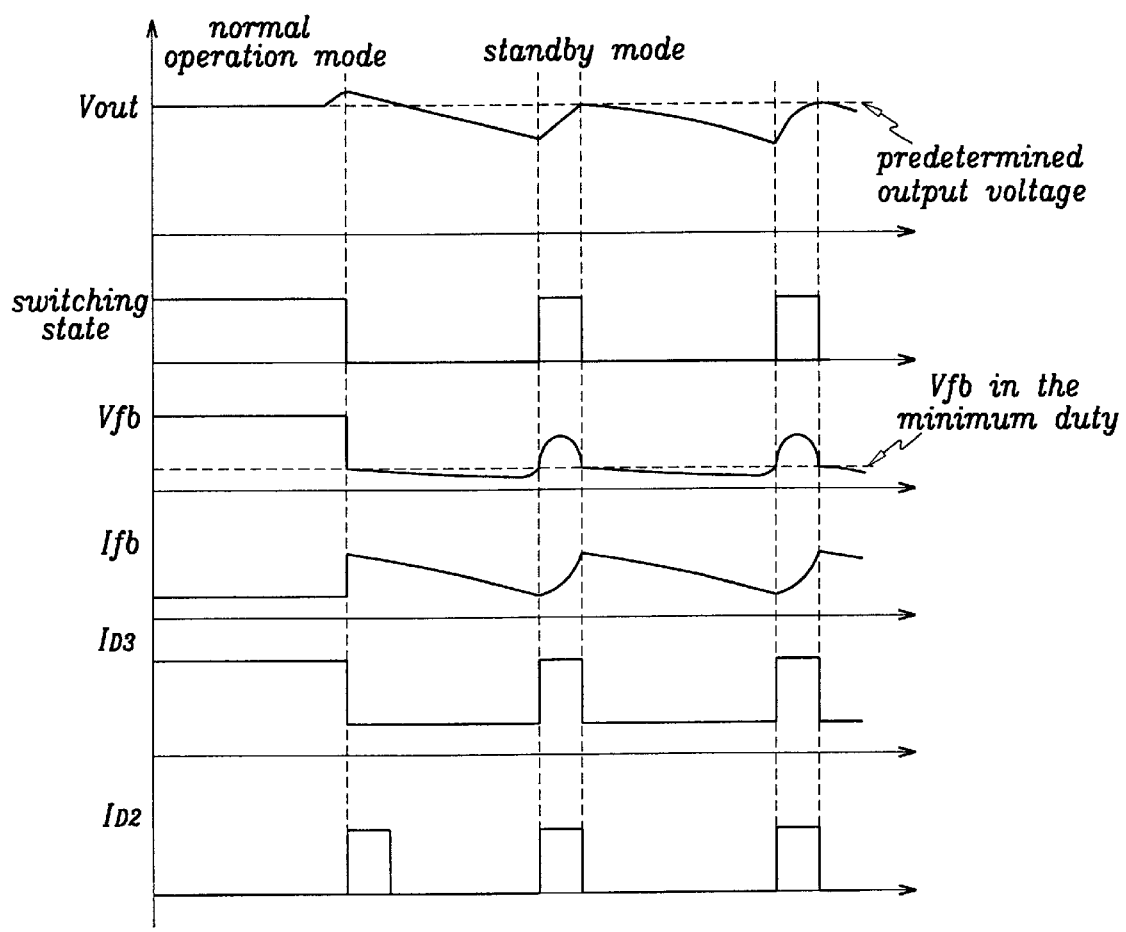
FIG. 7 shows waveforms of the main operation of each circuit described in FIG. 6.

The feedback voltage Vfb corresponding to the minimum duty cycle in FIG. 7 is the voltage at which Vd input to the comparator is equal to the offset voltage, and more particularly, Vfb=(Ra+Rb)/Ra×Voffset.

Figure 8:
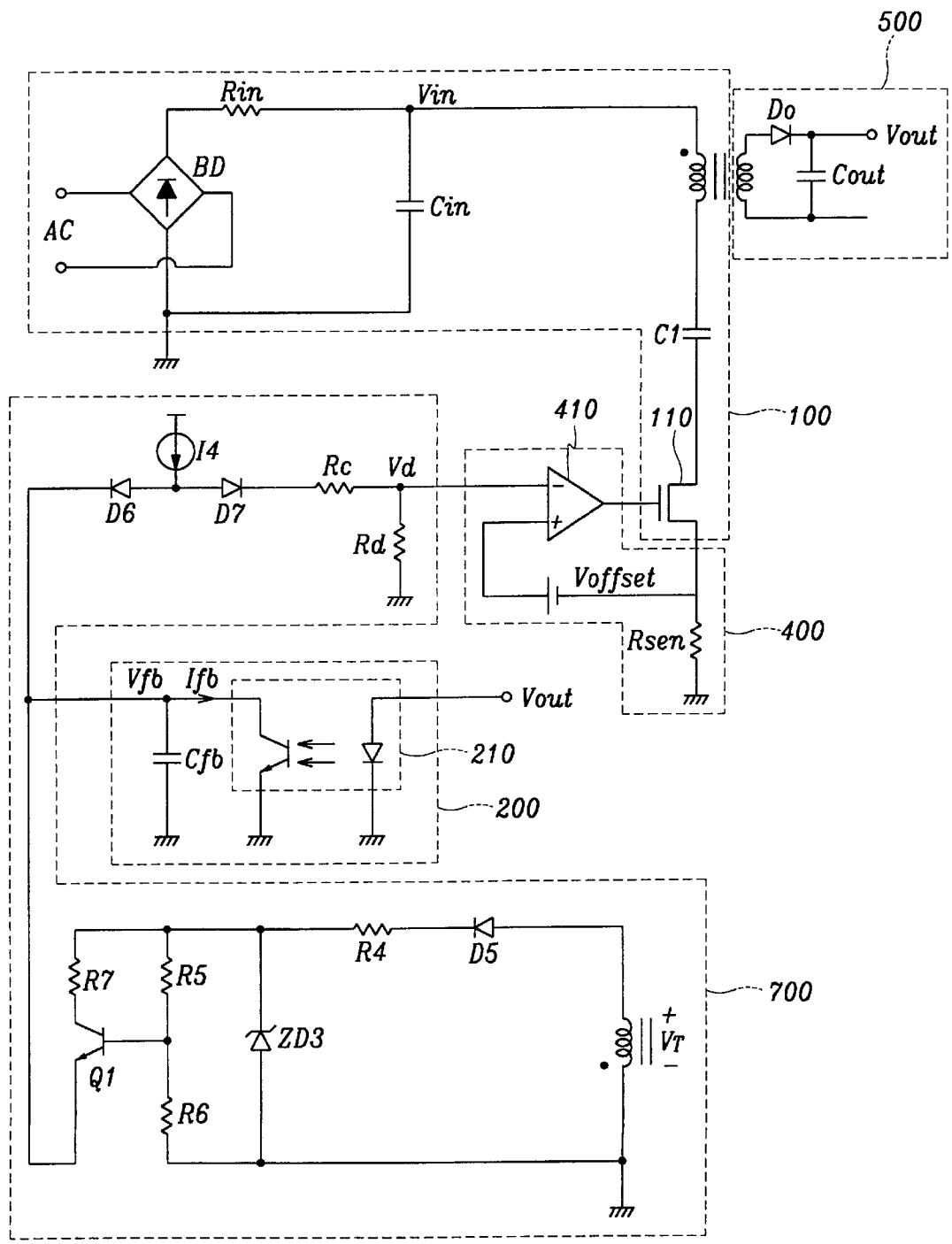
FIG. 8 shows a more detailed circuit diagram of an SMPS in accordance with the second preferred embodiment of the present invention.

FIG. 8 shows more details of an SMPS in accordance with the second embodiment of the present invention. In FIG. 8, circuit elements similar to those in FIGS. 1, 4, and 6 are shown with the same reference numbers. The operation of the various circuits shown in FIG. 8 are in many ways similar to the operation described above described embodiments, therefore, further description of the circuits will not be provided.

Because an SMPS in accordance with the present invention executes switching operation for a first period and stops switching operation for a second period during standby mode, the switching loss and the input power can be decreased.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A method for controlling a switching mode power supply having a main switch for providing power to a load in a normal mode and a standby mode, wherein the switch has a minimum duty cycle, the method comprising:

generating a feedback signal responsive to the output voltage of the power supply;

controlling the output voltage of the power supply by controlling the duty cycle of the main switch responsive to the feedback signal;

alternately enabling and disabling the operation of the main switch during standby mode; and operating the main switch at a duty cycle that is greater than the minimum duty cycle when the main switch is enabled during standby mode;

wherein enabling the operation of the main switch during standby mode comprises enabling the operation of the main switch responsive to the output voltage of the power supply.

2. A method according to claim 1 wherein disabling the operation of the main switch during standby mode includes temporarily reducing the feedback signal below a level corresponding to the minimum duty cycle.

3. A method according to claim 1 further including:

detecting when the load decreases rapidly; and disabling the operation of the main switch when the load decreases rapidly.

4. A method according to claim 3 wherein detecting when the load decreases rapidly includes detecting when the output voltage increases rapidly.

5. A method according to claim 3 further including:

detecting when the main switch is disabled; and manipulating the feedback signal when the main switch is disabled.

6. A method according to claim 5 wherein generating the feedback signal includes:

supplying a current to a capacitor; and diverting current from the capacitor responsive to the output voltage of the power supply.

7. A method according to claim 6 wherein manipulating the feedback signal when the main switch is disabled includes reducing the current supplied to the capacitor when the main switch is disabled.

8. A switching mode power supply comprising:

a main power section having a main switch for providing output power to a load in a normal mode and a standby mode;

a switch driver coupled to the main switch for controlling the main switch responsive to a feedback signal;

a feedback circuit coupled to the switch driver for generating the feedback signal responsive to the output power; and a feedback manipulation circuit coupled to the feedback circuit for manipulating the feedback signal during standby mode to disable the main switch during a first period in standby mode and to force the main switch to operate at a duty cycle which is greater than the minimum duty cycle during a second period of standby mode;

wherein the feedback circuit and the feedback manipulation circuit are adapted to enable the main switch at end of the first period in standby mode responsive to the output power.

9. A switching mode power supply according to claim 8 wherein:

the switch driver disables the main switch when the feedback signal reaches a level corresponding to a minimum duty cycle; and the feedback manipulation circuit temporarily maintains the feedback signal below the level corresponding to the minimum duty cycle during the first period in standby mode, thereby maintaining the switch in a disabled state.

10. A switching mode power supply according to claim 9 wherein the feedback circuit:

detects when the load decreases rapidly; and forces the feedback signal past the level corresponding to the minimum duty cycle when the load decreases rapidly, thereby disabling the switch and causing the power supply to enter standby mode.

11. A switching mode power supply according to claim 9 wherein the feedback manipulation circuit:

detects when the main switch is disabled; and manipulates the feedback signal while the main switch is disabled.

12. A switching mode power supply according to claim 9 wherein:

the feedback circuit includes:
a capacitor, wherein the feedback signal is a voltage across the capacitor, and
a dependent current source coupled to the capacitor and the main power section for diverting current from the capacitor responsive to the output power; and the feedback manipulation circuit includes a current supply circuit for supplying current to the capacitor at a first level while the main switch is enabled and at a second level when the main switch is disabled.

13. A switching mode power supply according to claim 12 wherein the current supply circuit includes:

a first current source coupled to the capacitor for supplying a first current to the capacitor;

a second current source for supplying a second current; and a switch coupled between the capacitor and the second current source and operating responsive to the main switch to couple the second current to the capacitor while the main switch is enabled.

14. A switching mode power supply according to claim 13 wherein:

the main power section includes a primary winding for coupling power to the load;

the second current source includes a secondary winding coupled to the primary winding; and the switch includes a transistor coupled between the secondary winding and the capacitor.

15. A switching mode power supply according to claim 12 wherein:

the main power section includes a primary winding for coupling power to the load; and the current supply circuit includes:
a current source coupled to the capacitor;
a resistor that is diode coupled to the current source for diverting current from the current source;
a secondary winding coupled to the primary winding and diode coupled to the resistor to prevent the resistor from diverting current from the current source while the main switch is enabled.

16. A switching mode power supply comprising:

a main power section for supplying power to a load during a normal mode and a standby mode;

switch drive means for controlling the main power section responsive to a feedback voltage;

feedback means for generating the feedback voltage responsive to the output voltage of the load; and current supply means for supplying a first current to the feedback means during a first period in standby mode and supplying a second current to the feedback means during a second period in standby mode;

wherein the main power section executes a switching operation at a first duty cycle in normal operation mode, stops switching operation during the first period, and executes switching operation at a second duty cycle during the second period and wherein the feedback means enables the switch drive means responsive to the output voltage in standby mode.

17. The switching mode power supply according to claim 16, wherein the feedback means includes:

a capacitor, wherein the feedback voltage is generated across the capacitor; and means for diverting current from the capacitor responsive to the output voltage of the load.

18. The switching mode power supply according to claim 17, wherein the means for diverting current includes a photocoupler.

19. The switching mode power supply according to claim 17, wherein the first period is longer than the second period.

20. The switching mode power supply according to claim 17, wherein the current supply means provides the first current or the second current to the feedback means responsive to a winding voltage applied to a secondary winding coupled to the primary winding.

21. The switching mode power supply according to claim 16, wherein the switch drive means includes:

a sensing resistor connected between a ground and a main switch in the main power section; and a comparator having a first input terminal for receiving a voltage detected by the sensing resistor, a second input terminal for receiving a voltage derived from the feedback voltage and an output terminal coupled to the main switch.

22. The switching mode power supply according to claim 21, wherein the switch drive means further comprises an offset voltage source connected between the sensing resistor and the first input terminal of the comparator.

23. A switching mode power supply comprising:
a main power section for supplying power to a load during a normal mode and a standby mode;
switch drive means for controlling the main power section responsive to a feedback voltage;
feedback means for generating the feedback voltage responsive to the output voltage of the load; and
current supply means for supplying a first current to the feedback means during a first period in standby mode and supplying a second current to the feedback means during a second period in standby mode;
wherein the main power section executes a switching operation at a first duty cycle in normal operation mode, stops switching operation during the first period, and executes switching operation at a second duty cycle during the second period;
wherein the feedback means includes:
a capacitor, wherein the feedback voltage is generated across the capacitor; and
means for diverting current from the capacitor responsive to the output voltage of the load;
wherein the current supply means provides the first current or the second current to the feedback means responsive to a winding voltage applied to a secondary winding coupled to the primary winding; and
wherein the current supply means includes:
a current source;
a first diode having an anode connected to the current source and a cathode connected to one terminal of the first capacitor in the feedback means;
second and third diodes, each having an anode connected to the current source;
first and second resistors connected in series with a cathode of the second diode, wherein a node voltage between the first and the second resistors is input to the switch drive means;
a third resistor and a third capacitor, each having one terminal connected to a cathode of the third diode;
a zener diode having a cathode connected to the cathode of the third diode;
a fourth resistor having one terminal connected to the cathode of the zener diode; and
a fourth diode having a cathode connected to the other terminal of the fourth resistor and an anode to which the winding voltage is applied.

24. The switching mode power supply according to claim 23, wherein the third diode turns off during the normal operation mode and the second period of the standby mode, and turns on during the first period of the standby mode.

25. A switching mode power supply comprising:
a main power section for supplying power to a load during a normal mode and a standby mode;
switch drive means for controlling the main power section responsive to a feedback voltage;
feedback means for generating the feedback voltage responsive to the output voltage of the load; and
current supply means for supplying a first current to the feedback means during a first period in standby mode and supplying a second current to the feedback means during a second period in standby mode;
wherein the main power section executes a switching operation at a first duty cycle in normal operation mode, stops switching operation during the first period, and executes switching operation at a second duty cycle during the second period;
wherein the feedback means includes:
a capacitor, wherein the feedback voltage is generated across the capacitor; and
means for diverting current from the capacitor responsive to the output voltage of the load;
wherein the current supply means provides the first current or the second current to the feedback means responsive to a winding voltage applied to a secondary winding coupled to the primary winding; and
wherein the current supply means comprises:
a current source;
a first diode having an anode connected to the current source and a cathode connected to one terminal of the first capacitor in the feedback means;
a second diode having an anode connected to the current source;
first and second resistors connected in series with the cathode of the second diode, wherein a node voltage between the first and the second resistors is input to the switch drive means;
a third diode having an anode to which the winding voltage is applied;
a third resistor having a cathode connected to the other terminal of the third resistor;
a zener diode having a cathode connected to the other terminal of the third resistor;
fourth and a fifth resistors each having one terminal connected to the other terminal of the third resistor;
a sixth resistor having one terminal connected to the other terminal of the fourth resistor; and
a bipolar transistor having a base connected to a node between the fourth resistor and the sixth resistor, a collector connected to the fifth resistor and an emitter connected to one terminal of the capacitor in the feedback means.

* * * * *

UNITED STATES PATENT AND TRADEMARK OFFICE
CERTIFICATE OF CORRECTION

PATENT NO.    : 6,188,587 B1                                              Page 1 of 1
DATED         : February 13, 2001
INVENTOR(S)   : Yun et al.

It is certified that error appears in the above-identified patent and that said Letters Patent is hereby corrected as shown below:

<u>Column 3,</u>
Line 1, "is a switching a switching mode" should read -- is a switching mode --.

Signed and Sealed this

Sixth Day of August, 2002

Attest:

Attesting Officer

JAMES E. ROGAN
Director of the United States Patent and Trademark Office